United States Patent Office 2,748,006
Patented May 29, 1956

2,748,006

OPTICAL GLASS

Norbert J. Kreidl, Brighton, and Earl K. Davis, Brockport, N. Y., assignors to Bausch & Lomb Optical Company, Rochester, N. Y., a corporation of New York No Drawing. Application December 6, 1952,
Serial No. 324,598

1 Claim. (Cl. 106—54)

This invention relates to glass compositions and more particularly it has reference to optical glasses which are adapted to be used for the manufacture of lenses for sun glasses or the like which reduce the intensity of light rays reaching the eye.

The ideal sun glass lens has neutral light absorbing properties so that it will function to reduce the intensity of light rays while still permitting colored objects to be viewed through the lens without change in color values. Since sun glass lenses are often ground so as to correct the wearer's refractive errors, it is desirable that the glass used for such lenses should have a refractive index of about 1.523 so that the standard tools which are used for grinding prescription lenses may also be used for the manufacture of prescription sun glass lenses. It is also desirable that the glass used for such lenses be capable of fusion with segments of glass of higher refractive indices in order to produce bifocal sun glass lenses. Other desirable requirements are that such sun glass lenses appear to be grey; that they have a low transmission in the ultraviolet and infrared regions for reasonable intervals beyond the visible range of the spectrum and that they have good resistance to chemical action.

Accordingly, the present invention seeks to provide an optical glass which will possess substantially the above-mentioned characteristics so that the glass is well adapted for use in sun glass lenses. Other objects and advantages will be apparent from the description of the invention.

Glasses embodying our invention comprise, by weight, the following: 45–65% of $SiO_2$, 1–19% of $B_2O_3$, 1–19% of $Al_2O_3$, 0–14% of $K_2O$, 0–14% of $Na_2O$, 0–6% of $Li_2O$, 1–5% of ZnO, 0–5% of $ZrO_2$, .05–2% of C or Si, .5–5% of $Fe_2O_3$, .5–2% of F or $P_2O_5$ and .001–.01% of $Co_3O_4$. The total $Al_2O_3$ plus $B_2O_3$ amounts to 10–21%; the total $K_2O$ plus $Na_2O$ amounts to 8–14%; the total $Al_2O_3$ plus $B_2O_3$ plus $ZrO_2$ amounts to 10–25%; and the total $K_2O$ plus $Na_2O$ plus $Li_2O$ amounts to 10–16%.

Iron is generally used in glass, specifically also in ophthalmic (eye) glasses, to cause absorption in the violet and red, thus producing a glass which is decidedly green in appearance. In the present glass iron is also added as a colorant, however, in combination with a base composition type which is substantially different from the alkali-calcium-silicate type base glasses conventionally used in green glasses. This base composition type was found experimentally to cause a minimum difference between the violet, green and red spectral absorption ranges and so to produce a glass which is characterized by a grey appearance and has a substantially flat spectral absorption curve. This type of base composition to be used in conjunction with iron is characterized by:

1. The absence of the main group II elements of the periodic system; namely, Ca, Sr, Ba. Especially Ca, the common constituent of all ordinary, e. g. window, plate, bottle, ophthalmic (eye) glasses, was found to promote the green appearance owing to an increased difference in absorption toward the violet and red ends of the spectrum.

2. The presence of, in place of those main group II elements, substantial amounts of $B_2O_3$ and $Al_2O_3$ with, or without, $ZrO_2$. The total amount of $B_2O_3$ plus $Al_2O_3$ being 10–21% and the total amount of $Al_2O_3$ plus $B_2O_3$ plus $ZrO_2$ being about 10–25%.

3. A reducing agent, such as charcoal, or silicon metal, must be used, to control the ends, particularly the red end of the absorptive curve. An excess causes a drop at the red end of the transmission curve, while a lack of it produces a drop in the violet, and a raising of the red end of the transmission curve.

4. The flatness of the spectral absorption curve of the boroaluminate glasses is substantially improved if .5–2% calculated added weight of F or $P_2O_5$ is added in the form of any fluorides or phosphates.

5. A small amount (.001–.01%) of cobalt oxide is also used to correct in the spectral absorption curve a trend to greater absorption at the shorter wave length.

In the case of bifocal fusion, high alkali and low borate contents are generally required to obtain the necessary expansion matches with an ordinary soda lime glass. However, both these changes seriously interfere with flatness of the spectral absorption curve and chemical durability. The high aluminum variants described in this invention, and exemplified below, are particularly suited to be used in this difficult application.

The following are examples of glasses calculated from their respective batches and embodying our invention:

|  | Example | | |
| --- | --- | --- | --- |
|  | 1 | 2 | 3 |
| $SiO_2$ | 54 | 61 | 57 |
| $B_2O_3$ | 18 | 4 | 11 |
| $Al_2O_3$ | 1.5 | 14 | 10 |
| $K_2O$ | 13.0 | 5.0 | 5.5 |
| $Na_2O$ |  | 4.5 | 7 |
| $Li_2O$ |  | 5.5 | 3.5 |
| $K·HF_2$ | 1.5 | 1 |  |
| ZnO | 3.5 | 2 | .86 |
| $ZrO_2$ | 5.0 |  |  |
| $Fe_2O_3$ | 2.7 | 2.9 | 3 |
| $Co_3O_4$ | .006 | .006 | .006 |
| $As_2O_5$ | .5 |  |  |
| Si | .294 |  |  |
| C |  | .094 | .134 |
| $P_2O_5$ |  |  | 2 |
|  | 100.000 | 100.000 | 100.000 |
| $N_D$ | 1.514 | 1.524 | 1.523 |

A piece of glass having a thickness of 1.95 mm. and the composition of Example 1 has the following spectral transmission characteristics:

Wave length in millimicrons:     Percent transmittance
460 —————————————————— 14
480 —————————————————— 15
500 —————————————————— 15
520 —————————————————— 15.5
540 —————————————————— 16
560 —————————————————— 16
580 —————————————————— 16.5
600 —————————————————— 16.5
620 —————————————————— 16.5
640 —————————————————— 16.5
660 —————————————————— 16.5
680 —————————————————— 16.5
700 —————————————————— 16

The glass embodying our invention has a grey appearance and is characterized by relatively low transmission in the ultraviolet and infrared regions for reasonable ranges beyond the visible region of the spectrum. The glass, such as Example 2, possesses the proper characteristics so that it may be fused to other glasses for producing bifocal lenses. As shown in the above table, our glass has a substantially flat spectral absorption curve in the visible range of the spectrum so that it has substantially neutral light absorbing properties. Our glass is also chemically stable and resistant to devitrification.

We claim:

A borosilicate glass having substantially neutral light absorbing properties in the visible range of the spectrum consisting essentially of by weight 45–65% $SiO_2$, 1–19% $Al_2O_3$, 1–19% $B_2O_3$, up to 14% $K_2O$, up to 14% $Na_2O$, up to 6% $Li_2O$, 1–5% ZnO, .5–5% $Fe_2O_3$, .5–2% F, .05–2% C, and .001–.01% $Co_3O_4$, the total $Al_2O_3$ and $B_2O_3$ being 10–21%, the total $K_2O$ plus $Na_2O$ being 8–14%, the total $K_2O$ plus $Na_2O$ plus $Li_2O$ being 10–16% and the remainder of the composition comprising compatible oxides.

References Cited in the file of this patent

UNITED STATES PATENTS

| | | |
|---|---|---|
| 1,143,732 | Schott | June 22, 1915 |
| 2,582,852 | Shoemaker | Jan. 15, 1952 |

FOREIGN PATENTS

| | | |
|---|---|---|
| 356,322 | France | 1905 |